Jan. 14, 1964      H. T. WILTON      3,117,489
IMAGE PROJECTOR WITH AIR CIRCULATING MEANS
Filed Oct. 14, 1960      2 Sheets-Sheet 1

INVENTOR.
HENRY T. WILTON
BY
Beau, Brooks, Buckley & Beau.

3,117,489
IMAGE PROJECTOR WITH AIR
CIRCULATING MEANS
Henry T. Wilton, Buffalo, N.Y., assignor to American Optical Company, Southbridge, Mass.
Filed Oct. 14, 1960, Ser. No. 62,634
8 Claims. (Cl. 88—24)

This invention relates to image projection machines, and more particularly to an improved projector which is provided with a greatly improved ventilation system.

Provision for positive and efficient ventilation is a requirement in the design image of any projector because the light source generates heat in a closely confined space; and the primary object of the present invention is to provide an image projection device having an improved heat-dissipating system minimizing hot areas on the casing as well as the temperature of the air within the casing.

Another object of the invention is to provide a projector as aforesaid in which the copy sheet of which an image is to be projected, is positioned in an air-pressurized area in such manner that a controlled air flow holds the copy sheet in proper position, without need for any mechanical hold-down devices or the like.

Still another object of the invention is to provide an image projector as aforesaid in which the ventilating air outlet is so arranged and positioned that there are no undesirable air flow currents issuing from the base or sides of the projector, such as would blow upon the surrounding work areas and/or discomfort the operator.

Yet another object is to provide a projection machine as aforesaid which is so designed as to reduce light leakage therefrom to a minimum and to minimize the deleterious effects of unavoidable light emission.

Other objects and advantages will appear from the detailed description hereinbelow and the accompanying drawings wherein.

Figure 1:
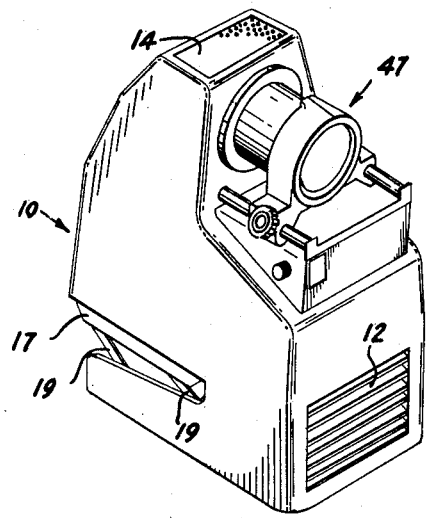
FIG. 1 is a front end perspective view of a projector of the invention.

Referring now to the drawings, one form of projector incorporating the present invention is shown as comprising a housing 10, which is constructed to be substantially air-tight except for provision of an air inlet 12, an air outlet 14, and a perforated, copy-holding platen 15. The platen 15 is margined by downward and inwardly sloping baffle members 17, and a bottom plate 18 is provided in spaced relation to the platen 15 to prevent outside light from passing into the machine. The upper surface of the platen is imprinted with guide lines 16, 16 to aid the operator in properly aligning copy thereon.

The platen 15 is carried by a pair of parallelogram-forming arms 19—19 on each side thereof, each of said arms being pivotally mounted at its upper end to the platen frame, and having its lower end pivotally mounted to the base of the casing 10 as illustrated.

So that the platen 15 may be raised from its lowered or loading position to its projecting or closed position, the two rear arms 19, 19 are formed with crank portions 20, 20, which are tied together by a cross bar 21. A lever 23 is pivotally mounted at 24 (FIG. 2) on a cross bar 25 which spans flange portions 27, 27 of the base of the casing 10. A second cross bar 28 is similarly mounted at the rear end of the machine to brace the casing 10 and provides sliding support for the other end of the lever 23. A cam plate 30 (FIG. 2) is arranged to have its camming face bear against the cross bar 21, and is fixedly mounted to turn with the lever 23 so that swinging of the lever to either side of center will cam the cross member 21 backwardly, thereby raising the lever arms 19—19 and the platen 15.

The lever 23 is arranged to be held in the platen "up" position by means of a clamping arm 32 which is fixed to the lever 23, as by a rivet 33, and passes below the cross bar 28 and is there connected to the lever 23 by a threaded fastener 34. Thus, the cross bar 28 lies between the lever 23 and the clamp arm 32, and the lever may be retained in any position of adjustment by tightening down on the fastener 34 to clamp the bar 28 between the lever 23 and the clamp plate 32. The effect of gravity will return the platen to its lower position whenever the lever is moved back to its "center" position.

Figure 2:
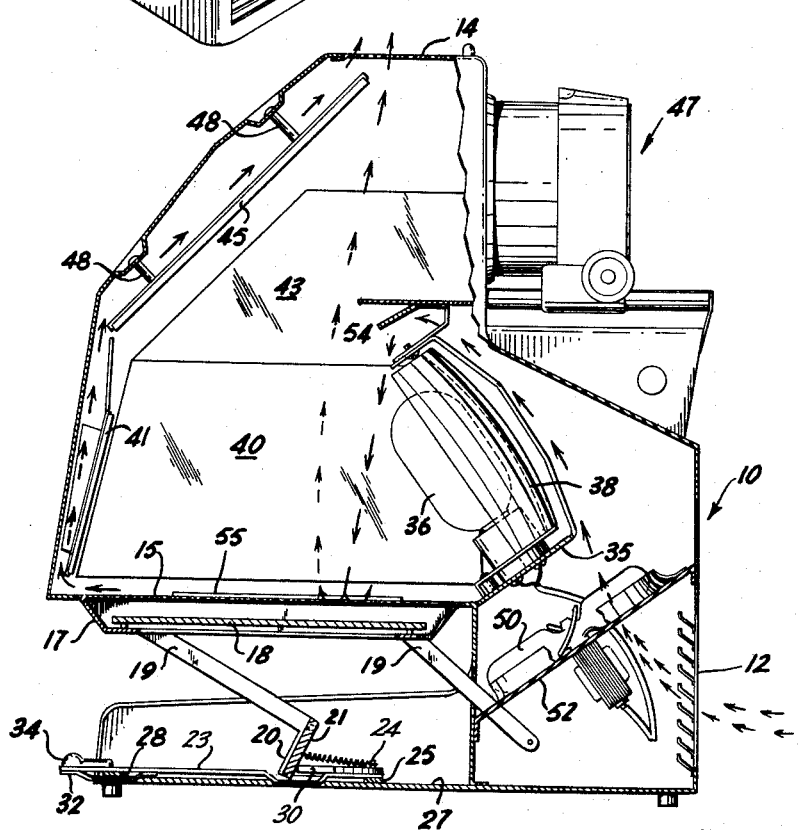
FIG. 2 is a longitudinal section, on enlarged scale, taken on line II—II of FIG. 1.
Figure 3:
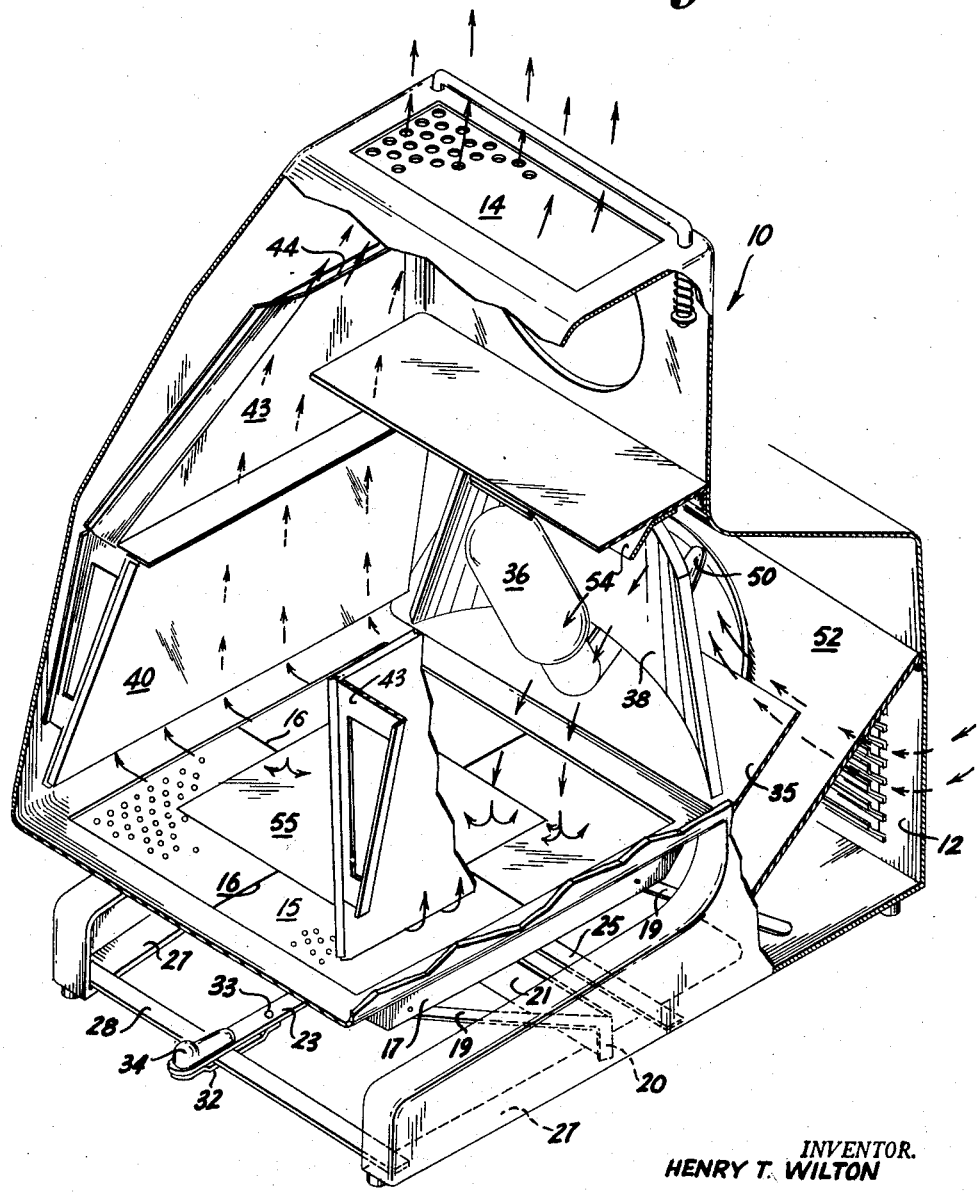
FIG. 3 is a rear end perspective view thereof, with portions broken away to show the interior construction.

Interiorly of the casing a bracket plate 35 carries a light source such as a bulb 36 which is backed by a reflector 38. Reflecting mirrors 40—40 are disposed in spaced relation to and adjacent each side of the casing, and a mirror 41 is similarly spaced from the rear end wall of the casing opposite the light bulb 36, to concentrate the light upon the platen 15. As stated, the mirrors 40—41 are mounted in spaced relation to the bottom and side and end walls of the casing by mounting them against flat wall ducts 42—43 which provide the desired flow pattern of ventilating air as will be explained hereinafter. The ducts 43—43 terminate in open ends 44—44 adjacent the air outlet 14 in the top of the casing 10. An image reflecting mirror 45 is mounted above the platen 15 at a suitable angle to reflect the image of the copy mounted on the platen to a projecting lens assembly which is indicated at 47. The lens assembly will not be described in detail as it forms no part of the present invention. As best seen in FIG. 2, the mirror 45 is also mounted in spaced relation to the top rear wall of the casing 10 as by struts 48, to provide therebehind an air flow duct delivering to the outlet 14.

Forced air ventilation through the interior of the projector is provided by an electric fan 50 which is mounted in a bulkhead 52 positioned adjacent the inlet 12 as shown. Air drawn into the casing by the fan is forced upwardly behind the reflector 38 until it strikes a top deflector 54, which forces the air to turn downwardly against the platen 15 and any copy which has been placed thereon. Some of the air flow striking the platen 15 will flow downwardly through the perforations therein, and this air will flow down around the baffle 18 and out through the bottom of the casing. This adds a suction effect to the copy flattening effect of the impingement of air thereon and the copy is thereby held firmly in place. However, the volume of air inducted by the fan is considerably greater than bleed off through the perforated platen 15, so that a considerable amount of air will flow off toward the sides of the casing after impinging on the platen and will enter the air ducts at the sides of the casing behind the three mirrors, 40, 40, 41, 45. Thus this air will be forced upwardly by the high pressure in the central area of the projector; and, having been heated by passing around the bulb 36, it will also naturally tend to rise, thus aiding its discharge through the outlet 14.

Thus it will be apparent that cool air inducted through inlet 12 will flow over and around the heat source to cool the latter, and will impinge on the copy and the platen 15, thereby holding said copy flat. It then enters the peripheral air ducts and rises to the outlet 14, where it is discharged upwardly and away from any surrounding work areas and/or the operator of the projector. The only light leakage from the machine is through the air outlet 14 at the top of the casing. Thus the light is emitted upwardly only and there is no reflection thereof from adjacent parts of the projector.

From the foregoing it will be apparent that the projector of the invention provides all of the above mentioned objects and advantages by uncomplicated means involving no unusually costly manufacturing procedures and that, although only one form of projector of the invention has been shown and described, certain changes and modifications may be made therein without departing from the spirit of the invention or the scope of the appended claims.

I claim:

1. An image projection machine comprising, a substantially air tight housing having bottom, side and top wall portions, an air inlet port in said housing, a platen for holding copy to be projected mounted in said housing, a light source mounted in said housing to illuminate the area of said platen, air induction means mounted below said light source and operable to draw air through said inlet port and direct the same upwardly toward said light source, an air deflector mounted in said housing above said light source to cause air flowing past said light source to be deflected downwardly to impinge against the surface of said platen, and air duct means extending adjacent the walls of said housing and having their intake ends adjacent the perimeter of said platen and their outlet ends discharging to an air outlet port formed in a top wall portion of said housing.

2. An image projection machine comprising, a substantially air tight housing having bottom, side and top wall portions, an air inlet port in said housing, a copy-supporting platen mounted horizontally in said housing so as to be movable between an open copy-receiving position and a closed projecting position, a light source mounted in said housing and disposed to illuminate the area of said platen, air induction means operable to direct air upwardly to flow over and around said light source, a deflector mounted in said housing above said light source to intercept air flowing past said light source and redirect the same downwardly against said platen, air duct means adjacent the side walls of said housing and having their intake ends adjacent the perimeter of said platen and their outlet ends discharging adjacent a top wall portion of said housing, said housing having an air inlet adjacent said air duct means and an outlet in said top wall portion of the housing.

3. An image projection machine comprising, a substantially air tight housing having bottom, side and top wall portions, an air inlet port in said housing, a perforate copy-supporting platen mounted substantially horizontally on said housing so as to be movable from an open copy-receiving position to a closed projecting position, a light source mounted in said housing and disposed above said platen to illuminate the area thereof, air induction means mounted in said housing below said light source and operable to draw air through said inlet port to flow upwardly toward said light source, a deflector mounted in said housing above said light source to cause air flowing past said light source to be deflected downwardly and impinge against said platen, air duct means adjacent the side walls of said housing and having their intake ends adjacent the perimeter of said platen and their outlet ends discharging to an air outlet port formed in a horizontal top wall portion of said housing, and light reflecting means mounted on said duct means.

4. An image projection machine comprising a substantially air tight housing including a front wall portion and having an open bottom, a platen assembly normally closing said open bottom and providing a copy support, a lens assembly mounted on said front wall portion in the upper region of said housing above said platen assembly, a light source mounted in said housing adjacent said front wall portion below said lens assembly but above said platen assembly, air induction means mounted within said housing below said light source and oriented to direct air upwardly toward said light source, air deflector means fixed to said housing above said light source but below said lens assembly and being positioned to intercept air passing upwardly beyond said light source and deflect the same downwardly against said platen assembly, air passage means including reflectors to direct light onto said platen assembly and an image reflector for reflecting the image of copy placed upon said platen assembly to said lens assembly, said air passage means forming, with the walls of said housing, air passageways leading from adjacent the marginal edges of said platen assembly to the uppermost region of said housing, said housing having an air inlet adjacent said air induction means and an air outlet in said uppermost region thereof.

5. An image projection machine comprising a substantially air tight housing including a front wall portion and having an open bottom, a platen assembly normally closing said open bottom and providing a copy support, a lens assembly mounted on said front wall portion in the upper region of said housing above said platen assembly, a light source mounted in said housing adjacent said front wall portion below said lens assembly but above said platen assembly, air induction means mounted within said housing below said light source and oriented to direct air upwardly toward said light source, air deflector means fixed to said housing above said light source but below said lens assembly and being positioned to intercept air passing upwardly beyond said light source and deflect the same downwardly against said platen assembly, air passage means including reflectors to direct light onto said platen assembly and an image reflector for reflecting the image of copy placed upon said platen assembly to said lens assembly, said air passage means forming, with the walls of said housing, air passageways leading from adjacent the marginal edges of said platen assembly to the uppermost region of said housing, said housing having an air inlet adjacent said air induction means and an air outlet in said uppermost region thereof, said platen assembly including a perforate copy-supporting plate and baffle means disposed therebelow to permit a limited amount of air to be bled outwardly of said housing through said baffle assembly.

6. An image projection machine comprising, in combination,
   a housing having an open bottom and a platen assembly thereat,
   a lens assembly mounted on said housing in an upper region thereof,
   a light source mounted in said housing above said platen assembly for illuminating copy thereon,
   means for inducting cooling air into said housing to pass over said light source and generally vertically downwardly toward said bottom of the housing,
   said platen assembly normally covering the open bottom of said housing to permit said means to build up the air pressure in said housing and said platen assembly having a copy-supporting surface for receiving copy flatwise thereon against which downwardly directed air from said means is impinged to flow laterally outwardly therefrom toward the surrounding wall portions of the housing, and
   air passage means having an inlet marginal to the copy-supporting area of said platen and having a discharge opening at the upper region of said housing,
   said air passage means including reflecting means for reflecting light upon and from copy on said platen assembly.

7. In an image projecting machine, in combination,
   a housing having upstanding wall portions, a bottom opening and an air discharge opening in the upper region thereof,
   a platen assembly normally closing the bottom opening of said housing and providing a copy supporting area,
   a light source in said housing above said platen assembly for illuminating said copy supporting area,
   means for inducting air into said housing and for directing such air over said light source and generally vertically downwardly toward said copy supporting area of the platen assembly, panel members fixed to the inner surfaces of said upstanding wall portions of the housing and spaced therefrom to provide air passages, said panel members terminating along their lower edges in spaced relation to said copy supporting area of said platen assembly to provide entrance openings to said air passages laterally of said copy supporting area, and said panel members terminating along their upper edges in proximity to said air discharge opening in the upper region of said housing to direct air discharged from said air passages to and through such opening.

8. The machine as defined in claim 7 wherein at least some of said panel members form light reflectors.

References Cited in the file of this patent

UNITED STATES PATENTS

| | | |
|---|---|---|
| 2,332,691 | Blaisdell | Oct. 26, 1943 |
| 2,362,601 | Wengel | Nov. 14, 1944 |
| 2,538,840 | Lowber et al. | Jan. 23, 1951 |
| 2,596,394 | Fitzgerald | May 13, 1952 |
| 2,979,986 | Miller | Apr. 18, 1961 |

OTHER REFERENCES

Germany, printed appln. 1,057,794, May 21, 1959.